United States Patent [19]

Newman

[11] Patent Number: 5,236,378
[45] Date of Patent: Aug. 17, 1993

[54] STORAGE OF PHOTOVOLTAIC ARRAYS ON A SHIP

[76] Inventor: Edwin Newman, 10331 Lindley Ave. #113, Northridge, Calif. 91326

[21] Appl. No.: 924,503

[22] Filed: Aug. 4, 1992

[51] Int. Cl.⁵ ............................................. B60L 11/02
[52] U.S. Cl. .......................................... 440/6; 114/95
[58] Field of Search ............... 114/39.1, 95, 102, 103, 114/104; 136/291; 440/6

[56] References Cited

U.S. PATENT DOCUMENTS

| | | | |
|---|---|---|---|
| 4,553,037 | 11/1985 | Veasey | 440/6 |
| 4,841,731 | 6/1989 | Tindell | 60/641.8 |
| 5,131,341 | 7/1990 | Newman | 114/39.1 |

FOREIGN PATENT DOCUMENTS 3836259 4/1990 Fed. Rep. of Germany .......... 440/6

OTHER PUBLICATIONS

Energy and the Oceans by Andre Brin, pp. 62-63.

Primary Examiner—Jesûs D. Sotelo

[57] ABSTRACT

A system for storing and installing horizontally-placed photovoltaic arrays on a ship. The prior art is improved by holding the arrays steady in a four-sided frame. The arrays are placed parallel to the keel, strung between two succeeding yards and rolled up by rotating guides placed near two succeeding masts, and lowered to the deck to reduce windage. The procedure may be reversed.

8 Claims, 3 Drawing Sheets

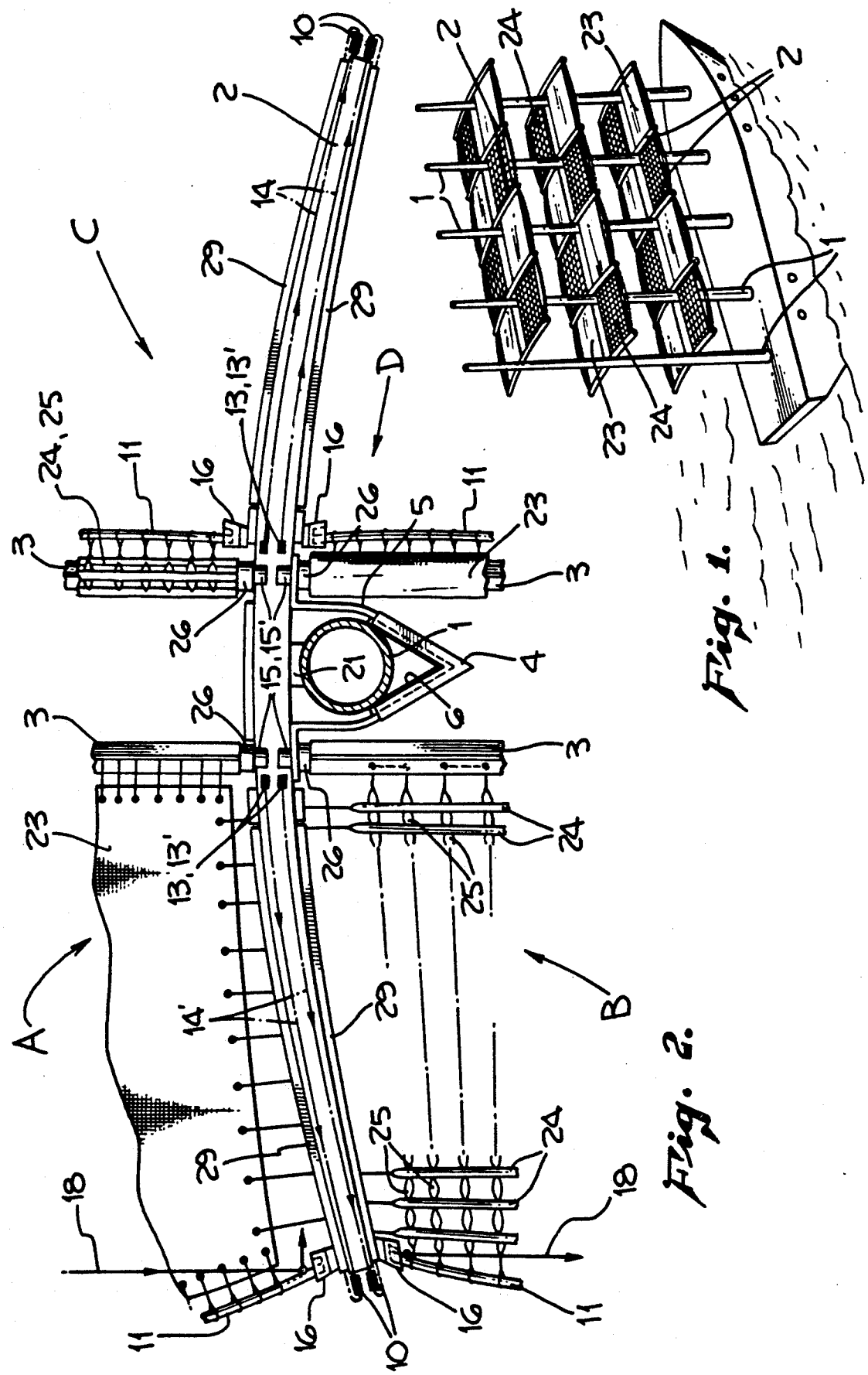

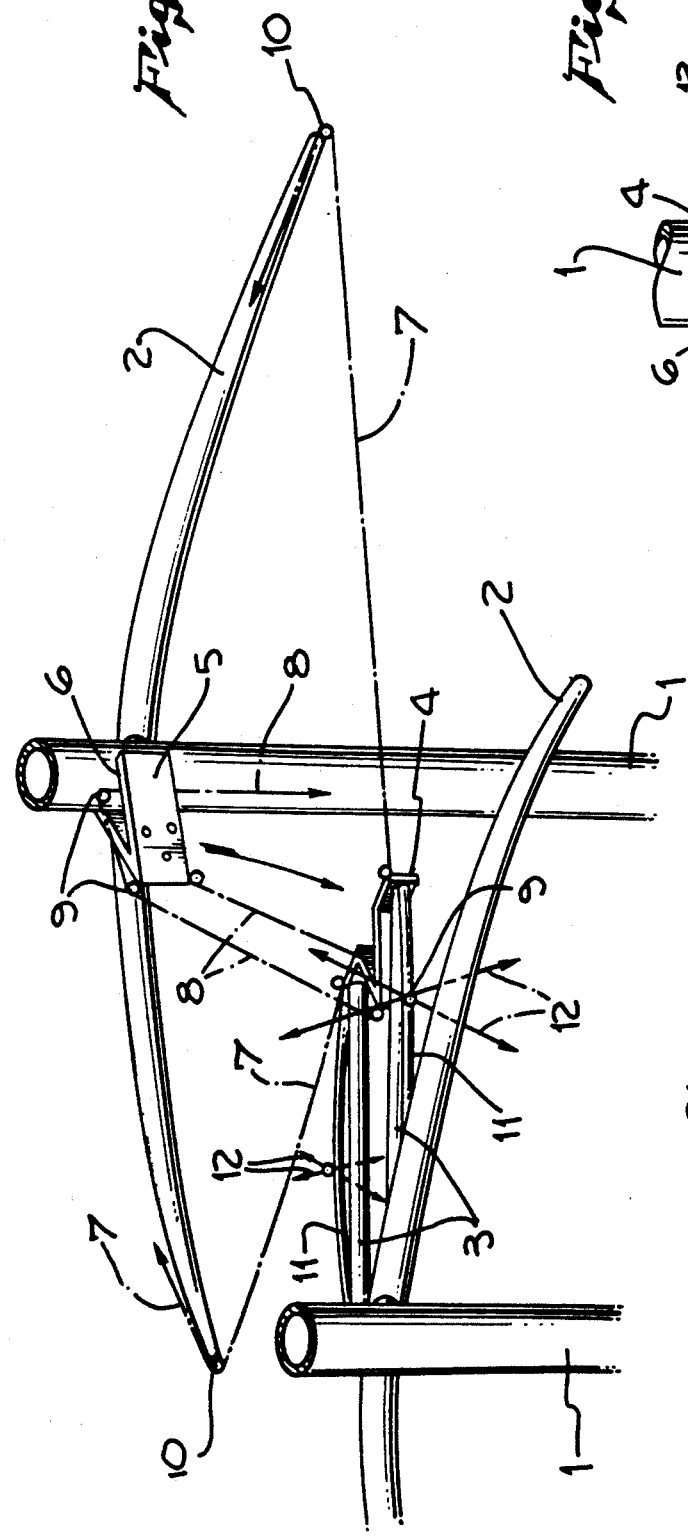
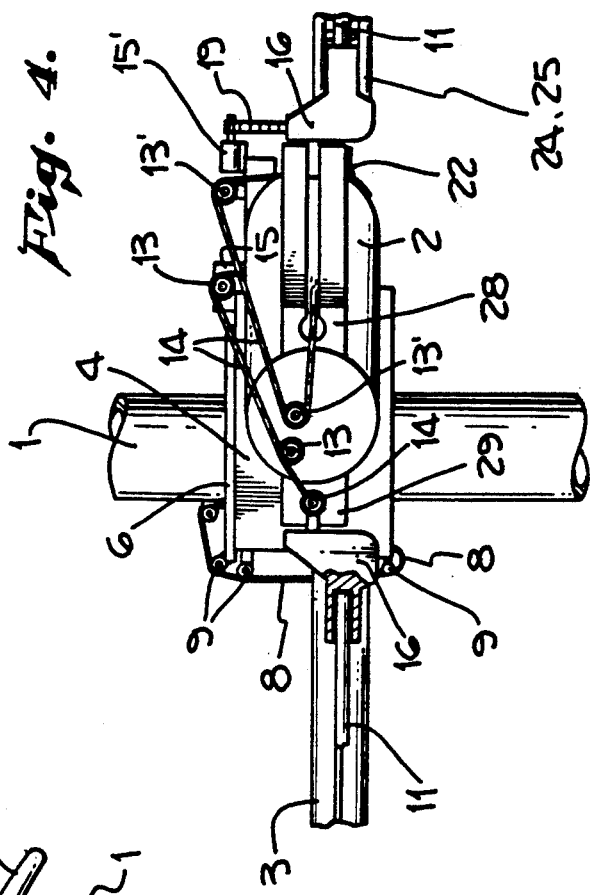
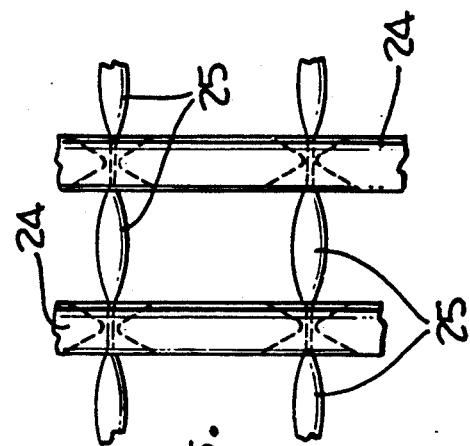

STORAGE OF PHOTOVOLTAIC ARRAYS ON A SHIP

BACKGROUND OF THE INVENTION

1. Field of the Invention

This invention relates to systems for producing electrical energy using the sails and rigging of orthodox sailing ships with some modifications and more particularly to a method for storing photovoltaic arrays used on ships having masts and yards.

2. Description of the Prior Art

The use of sails and rigging to produce electrical power on ships is disclosed in U.S. Pat. No. 5131341 by E. Newman. Photovoltaic arrays int he form of elongated beads are strung horizontally between the yards of succeeding masts. The array is made to roll up on a roller mounted parallel to a yard. However a lack of tension on the ropes holding the beads may easily cause them to tangle up. Due to the method of rolling up described there may be undue strain on the body of the beads, possibly bending or breaking them. Further, there is no effective way of preventing significant motion of the array, which may lead to fluttering and tangling of each rope causing the act of storage to be difficult.

SUMMARY OF THE INVENTION

The present invention is a system for rolling up and storing thin-film photovoltaic arrays on ships, in particular horizontally placed arrays between masts and attached to succeeding yards. Considering the plane area between two succeeding yards, the system consists in two rotating guides on either side of a mast extending between yards. On the rear of the forward yard and the front of the yard behind are two tracks. Between these tracks and suspended a number of thin tubes covered with photovoltaic cells. The tubes are connected to a cable on either end. Each cable is attached to either end of the rotating guide. A sail-like sheet covered with a photovoltaic array may alternatively be stretched the width of the track and the length of the rotating guide if the yards are not to be braced. Extended between the ends of the yards is a boom, flexible like a bow. Passing from the flexible boom to the nearer rotating guide are ropes running through holes in photo voltaic cell - covered tubes and strung with beads between tubes. The flexible boom is bowed out by a rope fitted like a bowstring, drawing taut all the ropes attached to the flexible boom. Rotating guides are attached by a demountable pivot to the front of the rear yard and demountably attached to the rear of the front yard. In operation, the rotating guide is made to revolve causing the array to be conveyed to and rolled up concentrically about the guide. The flexible boom is likewise conveyed next to the guide where it is secured. The guide and flexible boom is then pivoted about one of their common ends, downward from the forward yard. The pivot is then detached so the whole apparatus may be lowered to the deck to reduce windage. Provision is made for reversing the procedure.

The principal object of the present invention is to stabilize the horizontal photovoltaic array and therefore make storage a more routine procedure. Another object is to provide a storage system flexible enough to handle the contingencies of a marine environment.

The present invention also offers advantages in the design and operation of a solar powered ship as disclosed in U.S. Pat. No. 5131341 E. Newman:

1. For example, due to the effect of the ship's motor the ship may be propelled at such a speed that the yards, masts and sails become a drag on its motion. In this case the sails would be reefed and all yards would be braced to their maximum extent so as to present as small a profile to the resulting headwinds as possible. By eliminating the upper roller from the ship's design, less windage is created for this situation. This is an important reduction since it is assumed the user will prefer a more modern conception of a square rigged sailing ship than the PREUSSEN, such as a DYNASHIP which has no running or standing rigging. Such rigging greatly increases windage.

2. Unlike land based photovoltaic arrays, ocean based arrays absorb and transform solar energy not only from rays coming in a direct line from the sun, but also reflected off the surface of the water. If the ship is in port where the water surface is flat then it would be advantageous for the array to be held flat so as to maximize the solar energy input. The present system can achieve this since a flexible boom has been added.

3. The beads used to separate the tubes from one another may themselves be covered with photovoltaic cells, each with its own blocking diode. This will increase the area of the photovoltaic array.

4. The user may elect to store energy in the form of compressed hydrogen and oxygen instead of using a storage battery. This would be done in order to save weight. U.S. Pat. No. 4841731 by Tindell discloses a useful system in this regard: an array of photovoltaic cells drive an electrolysis generator in which water is converted to hydrogen and oxygen gases. These gases are compressed and stored and then recombined and burned. The resultant high pressure steam operates a turbine. Steam condensed to water is returned to the electrolysis generator, making a closed loop system. As Tindell's system envisions using a steam turbine rather than an electric motor, let us assume a 6000 H.P. turbine and that the user selects an air condenser rather than a water condenser. The square footage of condensing surface needed for this size turbine condenser is about 80,500 sq. ft. Assuming the user installs the present invention not in a ship like the "PREUSSEN", but like the "DYNASHIP", a modern design by Dr. W. Prolls of the University of Hamburg, Germany, then using the internal surfaces of the masts and yards as condensing surfaces gives:

| | |
|---|---|
| Masts - | 5,717 sq. ft. |
| Yards - | 5,717 sq. ft. |
| | 11,434 ft. sq. |

Attaching connecting hoses from the interior of the yards to the interiors of the Photovoltaic cell covered tubes of the array would greatly increase the condenser area. This cannot be done using prior art without separate hose for each bead. Assuming the lowest yards of each mast as having PV arrays between them then approximately 28,000 sq. ft. of condenser surface is added, 2½ levels of arrays would add 70,000 sq. ft. meeting the steam turbine's condenser surface requirement. The normal pitch and roll of the ship will suffice to evacuate water from the interiors of the arrays and yards into the masts. As an increase in temperature increases electrical resistance the user may wish to use more levels of array to reduce temperature quicker and mount electrical cables outside the masts and yards. On a DYNASHIP, sails are normally stored inside a mast. The user may wish to store these outside the mast in bolted-on tubes instead due to the excess heat within the mast. Further objects and advantages of the present invention will become apparent from a study of the following portion of the specification, the claims, and the attached drawings.

BRIEF DESCRIPTION OF THE DRAWINGS

FIG. 1 is a general view of a ship using the present invention showing several modes of operation for illustrative purposes only.

FIG. 2 is a top view of a typical yard utilizing the present invention on a DYNASHIP showing four different modes of operation.

FIG. 3 is a perspective view of the invention showing the manner of its pivoting for storage.

FIG. 4 is a diagrammatic end view of a typical yard utilizing the present invention.

FIG. 5 is a top view of part of the photovoltaic array.

DESCRIPTION OF THE PREFERRED EMBODIMENT

Figure 6:
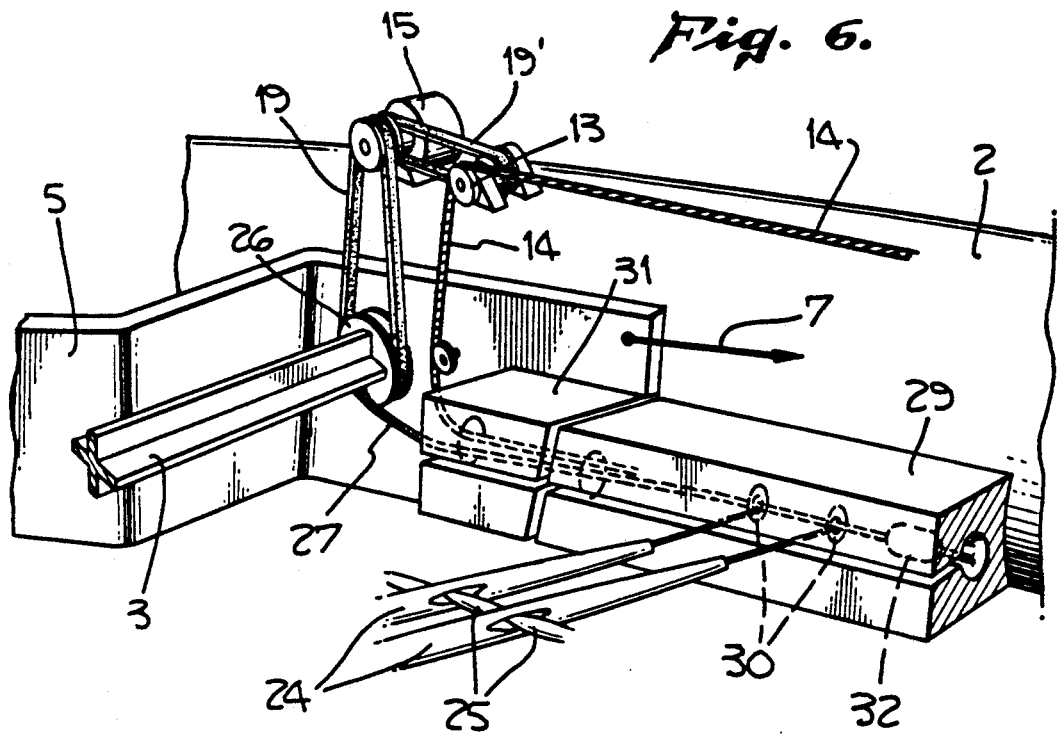
FIG. 6 is a perspective view of that part of the rear of a typical yard which is near the mast.

Referring to FIG. 2, which is a perspective view of the essential part of, the present invention, there is shown a ship's mast 1. Fixedly attached to mast 1 by means of parallel 21 is a yard 2. Yard 2 is curved as on a DYNASHIP. On either side of mast 1 is a rotating guide 3 which is connected at either end to two consecutive yards 2 horizontally. A first V-shaped guide 5 is fixedly attached to a mast 1 at the level of a yard 2. The second V-shaped guide 4 joins two parallel rotating guides 3 to each other on their forward ends. A universal joint 26 is on either end of each rotating guide 3 and joins the rotating guide 3 to either the second V-shaped guide 4 or a rear rotating guide holder 20. This is so the rotating guide 3 will remain parallel to the keel as yards 2 are braced.

Figure 7:
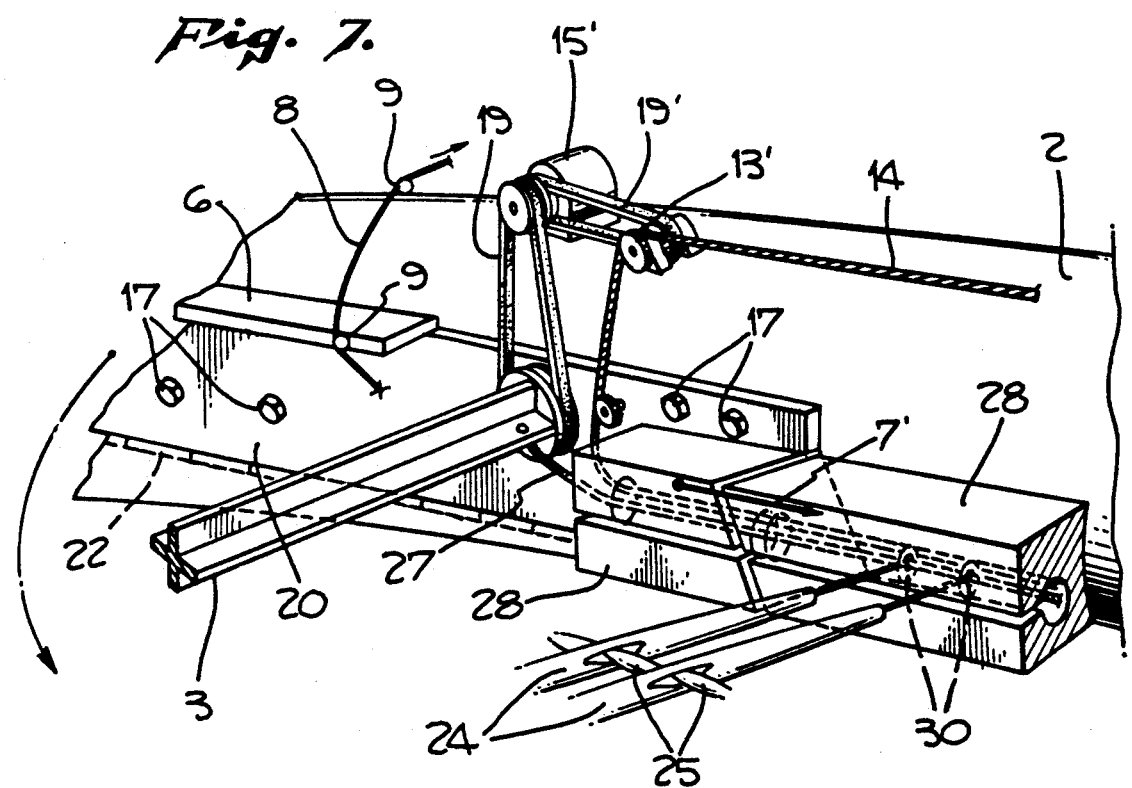
FIG. 7 is a perspective view of that part of the front of a typical yard which is near the mast.

Refer now to FIGS. 6, 7. Along the middle of the rear of yard 2 is a track 29. Along the middle of the front of yard 2 is a track 28. Tracks 29, 28 contain a cylindrical lubricated channel running the length of them. The channel slot runs parallel to the length of track 29, 28. One end of a cable 27 attaches to rotating guide 3, runs through the channel in track 29, 28 and attaches to a slug 32 within the track channel (FIG. 4). Attached also to either end of the slug is a loop of chain 14, 14' which is seen to run length of track 29 looping around sprockets 13 or 13' (FIGS. 2 or 4), located on top of a yard 2, to the end of the yard and to the opposite end of the slug 32 within the track channel. Motor 15 or 15' causes sprockets 13 or 13' respectively to rotate through the agency of belt 19, 19', causing the slug 32 to move along the track channel. The slug itself is fixedly attached through the slot to flexible boom guide 16. Annuli 30 circumscribe cable 27. The outer diameter of annuli 30 is larger than the channel slot in track 29, 28. Attached to annuli 30 may be attached a sail-like sheet 23 whose length is the length of track 29, 28 and whose width is the length of rotating guide 3, used if yard 2 is not to be braced. If yard 2 is to be braced then attached to annuli 30 are hollow tubes 24 extending parallel to and substantially the length of rotating guide 3. Hollow tubes 24 are each suspended between two annuli on two consecutive yards 2. Sail-like sheet 23 and hollow tube 24 are covered on all sides with thin film photovoltaic cells as explained in U.S. Pat. No. 5131341 by E. Newman. Now see FIG. 5. Hollow tubes 24 are spaced apart from each other by spacers 25. Spacers 25 are themselves covered with thin film photovoltaic cells, augmenting the area of the photovoltaic filed. There are slots in hollow tubes 24 for ropes connecting spacers 25. The slots extend through the width of hollow tube 24, but are narrow in the middle so as yard 2 braces ropes connecting the spacers 25 need not bend. The spacers 25 are suspended by a rope extending from rotating guide 3 to attachment to a flexible boom 11. On either end of a flexible boom 11 is a guide 16 with a hole to restrain its contained boom so as the boom flexes to its maximum extent it will still be restrained by a guide 16. Flexible boom 11 is flattened on either end and the receiving hole of the guide 16 is likewise flattened, so the flexible boom 11 cannot twist in the hole. Flexure is accomplished by a bowline 18 attached to either end of the flexible boom 11 so that when pulled the bowline acts as a bowstring on a bow. This pulls all spacer ropes 25 taut.

In FIG. 3, Pulleys 9 are to guide rope 8 and pulleys 10 are to guide rope 7. Guiding ropes 8 are attached to pulleys on the ends of yards at the next higher and lower levels where they are then run inboard and down a mast to the deck. They exist to restrain the flexible boom 11 from flipping up or down when tensioned by the bowline 18.

FIG. 2 is effectively divided into four quadrants marked A, B, C, D. Quadrant A shows the apparatus with a horizontal sail-like sheet outstretched. Quadrant D shows the apparatus with a sail-like sheet rolled up on a rotating guide. Quadrant B shows the tube and spacer arrangement outstretched. Quadrant C shows the tube and spacer arrangement rolled up on a rotating guide. Arrows c,d show the direction of rolling up of the array, c,d; arrows a,b show the direction of rolling out the arrays.

Operation of the present invention is best explained in reference to FIGS. 2, 5 and 6. For example it will be desirable to roll up the arrays and lower them to the deck at night during a storm in order to lower the center of gravity of a ship. First, bowline 18 is loosened so the array 23 or 24 is slackened in the direction it will be rolled up. Then motors 15, 15' operate belts 19, 19' to roll up the array. Flexible boom 11 and its guide 16 are moved in the same direction as the array 23 or 24, 25 through the same agency. Bowline holder 16 comes to rest in track section 28 or 31 respectively. The belts 19, 19' are disconnected from rotating guide 3 and chains 14, 14' are disconnected from bowline slug 3 which is fixedly attached to bowline guide 16. Then bolts 17 are removed which unite V-shaped guide 5 to a second V-shaped guide 4 then ropes 7, 12 and 8 are slackened so the arrays and associated paraphernalia 3, 5, 23 or 24, 25, 26, 27, 30, will rotate about pivot 22. Then bolts 17 joining rear rotating guide holder 20 to yard 2 are removed, freeing rear rotating guide holder 20 and cable track section 28 from yard 2. Then the hinge 22 is unbolted allowing the arrays to be lowered to the deck of the ship with ropes 7,8,12. In reversing the procedure it is best to bolt the pivoting hinge 22 in place, then using the pivoting hinge 22 to swing the opposite end of the rotating guide 3 in place. Lips 6 are meant to be guides to aid the installation procedure. The inboard end of track 29, where it joins track section 28, is angled so that it serves as a guide in the installation procedure. Rope 8 must be pulled tight to prevent the swaying of mast 1 from interfering with the insertion of bolts 17. Sprocket chains 14, 14' are used to stretch out array 23 or 24 from rotating guide 3 to the end of a yard 2. These various installation and storage subprocedures may be done by hand or motorized as the user sees fit.

From the above description, it is believed the preferred embodiment achieves the principal and subsidiary objects of the present invention. Alternative embodiments and various modifications of the embodiments depicted will be apparent from the above description to those skilled in the art. These and other alternatives are considered to be equivalent and within the spirit and scope of the present invention.

Having described the invention, what is claimed is:

1. A system for installing and storing photovoltaic arrays on a ship, comprising:
   solar photovoltaic cell arrays laying substantially horizontal,
   means for framing said photovoltaic arrays,
   means for rolling and unrolling said arrays connected to said arrays by ropes located along at least one side of said arrays,
   rigging means connected to said means for rolling and unrolling,
   guide means for said rigging means and for said rolling and unrolling means to facilitate installing and storing operations.

2. The photovoltaic solar array of claim 1 including sail-shaped sheets laid horizontally when deployed and covered on all surfaces with a plurality of thin-film photovoltaic cells which are electrically connected in series-parallel to form modules.

3. The photovoltaic solar array of claim 1 including tubes laid horizontally when deployed and covered on all surface with a plurality of thin-film photovoltaic cells which are electrically connected in series-parallel to form modules.

4. The photovoltaic solar array of claim 3, wherein the tubes are hollow so as to serve as surfaces for an air condenser for a steam turbine.

5. The means for framing the array of claim 1, comprising
   a plurality of masts provided on said ship,
   at least one yardarm mounted on each mast,
   a flexible boom joining two ends of two consecutive yardarms,
   a rolling member joining two consecutive yardarms, and
   two channeled tracks, one located along substantially all the length of the rear of a yardarm and the other located along substantially all the length of the front of a consecutive yardarm.

6. The photovoltaic array of claim 5 comprising
   a slug within said track channels,
   a cable joining said rolling member and said slug,
   a loop of chain extending the length of said track channel and joining the slug on either end,
   a means for moving said chain,
   a plurality of rings larger than the width of said channel,
   means for joining said photovoltaic arrays to said cable, and, motor means connected to said chain and cable for moving said cable and attached photovoltaic arrays the length of said channel to roll up around or roll out from said rolling member.

7. The system as set forth in claim 5, wherein said rigging means comprises a plurality of ropes which attach a flexible boom to a rolling member; each rope passes through a tube, and a plurality of spacers mounted on said ropes separates each tube from one another,
   ropes leading from the middle of a flexible boom to fixed points on the ship,
   a rope extends from a V-shaped guide fixed to a mast to fixed points on the ship and is used to raise and lower said V-shaped guide,
   a rope extends from a lateral end of said V-shaped guide to fixed points on the ship to prevent lateral motion of said V-shaped guide,
   a rope extends from a rotating guide holder mounted on the rear of a yardarm to fixed point on the ship to hold said rotating guide holder steady while being bolted to a yardarm, and
   a rope joining both end of said flexible boom extends to a fixed point on the ship.

8. The guiding means of claim 1 comprising
   a V-shaped member fixedly attached to a mast,
   a second V-shaped member located to be alignable with the first V-shaped member and joining a pair of rolling members,
   a flat member located on the front of a yard secured to a mast joins two rolling members,
   a section of channelled track is mounted nearest a mast with an angled side so as to rise to alignment with a channeled track mounted along the yard, and
   a member movably fixed to a slug located within said channelled track and to a distal end of a flexible boom joining the ends of two consecutive yards to guide and restrain said boom's motion.

* * * * *